E. THOMSON.
ELECTRIC SEAM WELDING.
APPLICATION FILED MAY 10, 1913.

1,083,956.

Patented Jan. 13, 1914.

WITNESSES

INVENTOR
ELIHU THOMSON
BY
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC SEAM-WELDING.

1,083,956. Specification of Letters Patent. Patented Jan. 13, 1914.

Application filed May 10, 1913. Serial No. 766,729.

*To all whom it may concern:*

Be it known that I, ELIHU THOMSON, a citizen of the United States, and a resident of Swampscott, in the county of Essex and State of Massachusetts, have invented certain new and useful Improvements in Electric Seam-Welding, of which the following is a specification.

My invention relates to methods of making seams in sheet metal by electric welding processes.

The invention has particular reference to the welding of thin sheets in continuous seams by overlapping the sheets or pieces and passing them between rollers which form the terminals of the welding transformer or other source of heating current. If the seam is of considerable length and this rolling process is employed, there is more or less of a tendency to buckle or distort the metal so that a straight seam is somewhat difficult to produce, and the metal will have lost more or less of its flat condition at the seam. This is due to the crowding down of the metal, and its lateral displacement.

The object of my invention is to avoid failure of making a proper seam due to this warping or buckling.

According to my invention the seam is first spot welded in a number of separated spots sufficient in number and nearness to one another to hold the parts securely in place for the final continuous weld, the spot welding being done with the plates or sheets in their proper position. This spot welding will not throw them out of position. Then, the seam having been, as it were, started in this way, the whole seam starting from any point is made by putting the work between the welding rollers and uniting the sheets or plates throughout the whole extent of their meeting to form the continuous seam desired. The spot welding prevents any displacement of the sheets one over the other during the final process, and therefore renders possible the making of a good job where otherwise it would be difficult.

The accompanying drawings illustrate in purely diagrammatic fashion the steps of the process.

Figure 1:
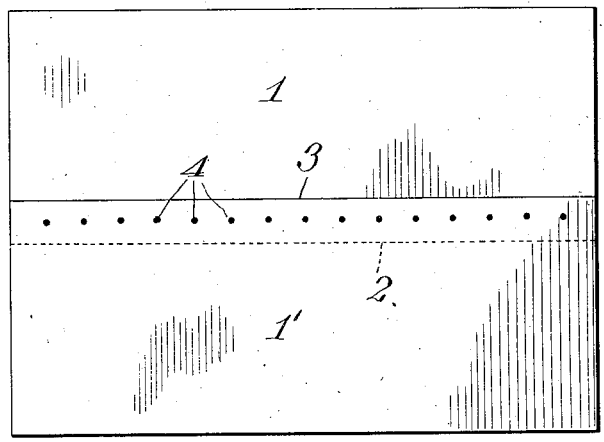

Figure 1 shows the first stage of the process, the two overlapped sheets being indicated by numerals 1, 1', the extent of the overlap by the distance between the dotted line 2 and the continuous line 3 forming the edge of the upper sheet and the spots being indicated at the points 4.

Figure 2:
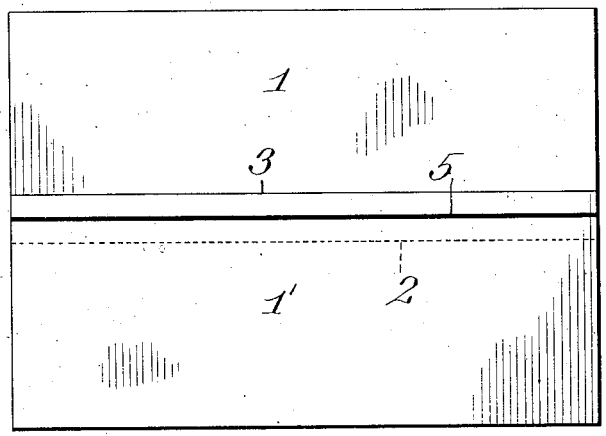

The second stage of the process is indicated by the Fig. 2, a continuous seam being merely indicated by the continuous line 5.

What I claim as my invention is:—

The hereindescribed improvement in making continuous seams in sheet metal by the electric welding process, consisting in first forming a number of welds at spots along the line of the proposed seam and then forming a continuous seam by the electric welding process along the line of said spots.

Signed at Lynn in the county of Essex and State of Massachusetts this 2nd. day of May A. D. 1913.

ELIHU THOMSON.

Witnesses:
JOHN A. McMANUS, Jr.,
HENRY A. ANDERSEN.